Nov. 18, 1958     H. A. WOLTER     2,860,465
ARTICLE COUNTING AND ASSEMBLING
Filed April 19, 1957
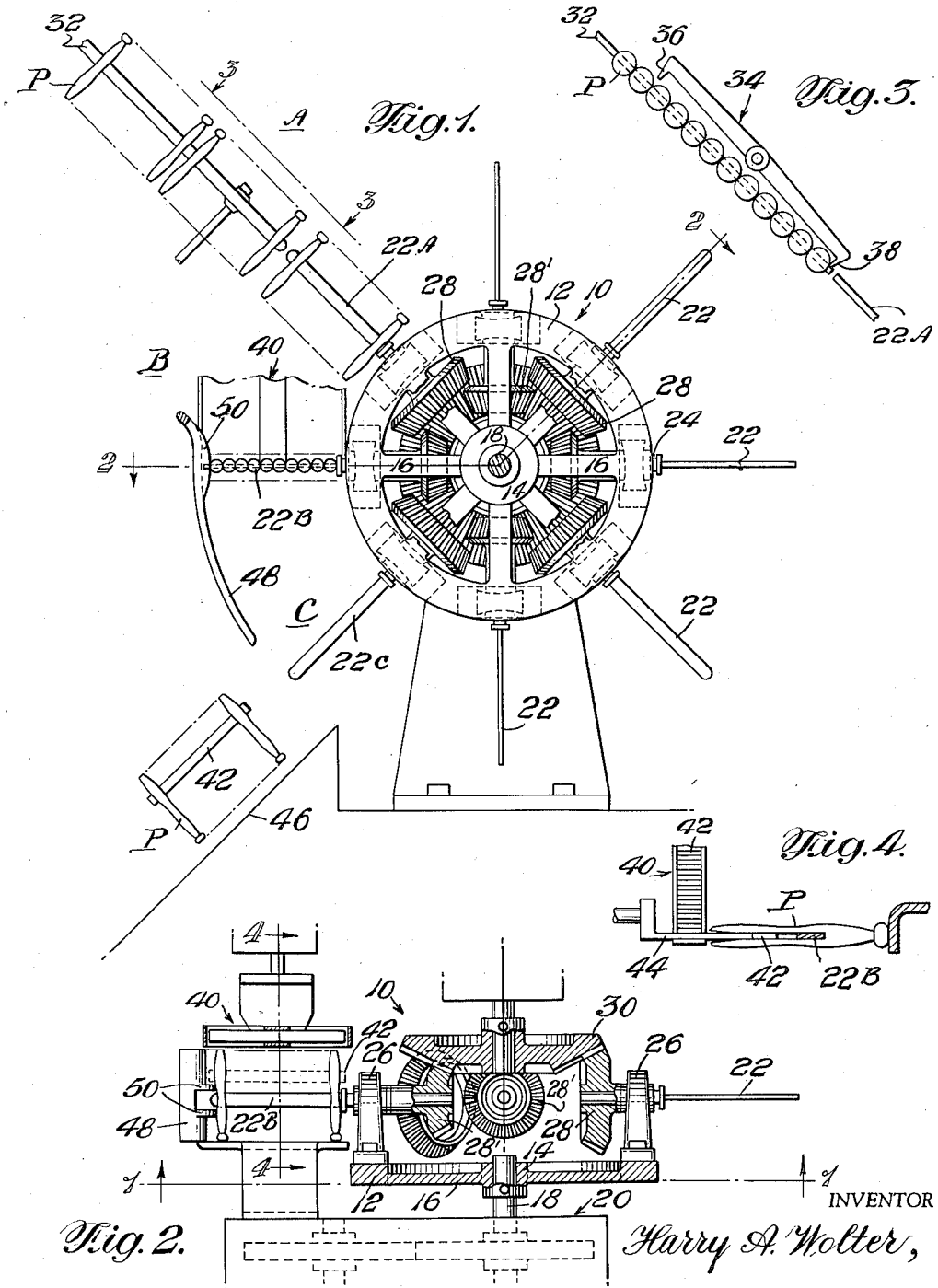
INVENTOR
Harry A. Wolter,
BY Karl W. Flocks
ATTORNEY

United States Patent Office 2,860,465
Patented Nov. 18, 1958

2,860,465

ARTICLE COUNTING AND ASSEMBLING

Harry A. Wolter, Akron, Ohio, assignor to Diamond Gardner Corporation, a corporation of Delaware Application April 19, 1957, Serial No. 653,928

13 Claims. (Cl. 53—197)

This invention relates to apparatus for and method of counting and assembling articles, and more particularly to an apparatus for and method of counting and assembling slotted articles such as one-piece wooden kerf type clothespins preparatory to a wrapping or packaging operation.

In the packaging of products such as clothespins and the like for retail sale, it is important that the packaging operation be rapid and economical. One method of packaging clothespins is to assemble a predetermined number of the clothespins onto a suitable holder, such as a stick or the like, and to subsequently wrap the clothespins in a sheet of cellophane or other suitable wrapping.

It is an object of this invention to provide an automatic apparatus for counting and assembling a predetermined number of slotted articles preparatory to a wrapping or packaging operation.

It is another object of this invention to provide an apparatus for counting and assembling slotted articles such as one-piece wooden kerf type clothespins which is efficient and economical in operation and which is suitable for mass production counting and assembling operations.

It is still a further object of this invention to provide an apparatus which assembles a predetermined number of articles into a unitary connected group for subsequent wrapping or packaging.

Still another object of the invention is to provide an improved method of assembling a predetermined number of slotted articles, such as kerf type clothespins, into a unitary group.

In achievement of these objectives, there is provided in accordance with an embodiment of this invention an apparatus particularly intended for counting and assembling kerf type clothespins but which could be used to count and assemble other similar articles, including a rotating turret member having a plurality of blade-like holder members mounted thereon. The turret is intermittently driven past a first or loading station at which an escapement device discharges a predetermined number of clothespins onto one of the blade-like holders. The turret is then rotated to a second station at which a stick-like member is pushed into engagement with the slots or kerfs of the plurality of pins supported on the given blade-like holder. The turret is then rotated to a third or discharge station at which the plurality of pins mounted upon the stick-like holder are discharged by gravity from the blade-like holder onto an inclined ramp or the like leading to a packaging station. Means are provided for rotating each of the holder members through an angle of 90° in passing from one station to another in order to insure that the blade-like holder is oriented in a plane most advantageous to the operations performed at the various stations.

Other objects and the nature and advantages of the invention will be apparent from the following description taken in conjunction with the accompanying drawings, wherein:

Fig. 1 is a vertical elevational view, partially broken away, of a counting and assembling apparatus in accordance with the invention;

Fig. 2 is a view in horizontal section along line 2—2 of Fig. 1;

Fig. 3 is a view along line 3—3 of Fig. 1; and

Fig. 4 is a view in vertical section along line 4—4 of Fig. 2.

Referring now to the drawings, there is shown conveyor means in the form of a rotatable turret generally indicated at 10 including an outer ring-like member 12 connected to a central hub member 14 by a plurality of radially-extending circumferentially spaced arms 16. A shaft 18 is rigidly connected to hub 14 and is intermittently driven from a suitable intermittent drive device generally indicated at 20.

A plurality of blade-like clothespin holder members 22 extend radially outwardly from ring 12 of turret 10. Each holder 22 includes a pair of oppositely disposed wide and substantially flat edges. Each of the holder members 22 is provided at its radially inner end with a relatively short shank portion 24 which is supported for rotation about its own longitudinal axis by a bearing member 26 mounted upon ring 12 of turret 10. At the radially inner end of the shank portion of each holder member 22 is mounted a bevel pinion 28 which is in geared engagement with a stationary bevel gear ring 30. The ratio of bevel pinion 28 to stationary bevel gear 30 is such that holder 22 rotates 90° about its own longitudinal axis when turret 10 moves through a circumferential arc corresponding to the spacing between successive holder members 22. In the illustrated embodiment, holders 22 are spaced 45° apart, and the holders are rotated 90° about their respective axes in rotating through the 45° arc corresponding to the spacing between successive holders 22. To obtain the movement of bevel pinions 28 just described, the bevel pinions are made one-half the diameter of stationary bevel gear ring 30. In order to accommodate the eight bevel pinions 28 and 28' which are required, stationary bevel gear ring 30 is provided with a wide face, and bevel pinions 28 and 28' are staggered, alternate pinions 28' being of smaller diameter and engaging the smaller diameter radially inner portion of the wide faced bevel gear ring 30. Each of the four pinions 28 has the same number of teeth as each of the four pinions 28' and as they each mesh with the common gear 30, the ratio between pinions 28 and gear 30 is the same as the ratio between pinions 28' and gear 30. Instead of using a single gear 30, it is to be understood that it is within the scope of the invention to utilize two concentric gears in place of the gear 30 in such fashion that the ratio between one of the concentric gears and the pinions 28 will be the same as the ratio between the other of said concentric gears and the pinions 28'.

Turret 10 is intermittently rotated by intermittent drive 20 to index holders 22 to three succesive stations indicated at A, B, and C. Turret 10 remains stationary while the holders are at the three successive stations for a sufficient length of time to permit the operations to be hereinafter described.

A stationary blade-like feeder 32 is positioned at station A and lies in a vertical plane which extends radially through the axis of rotation of turret 10. The inner end of blade-like feeder 32 stops just short of the path of rotation of the outer ends of holders 22 carried by turret 10. Feeder 32 includes a wide substantially flat edge which lies in a vertical plane parallel to the plane of the drawing.

The thickness of feeder 32 and of each holder 22 is sufficiently less than the thickness of the slot or kerf in the clothespins as to permit easy sliding movement of the clothespins on the feeder and the holders. Feeder 32 is supplied with clothespins P from a supply means which slides the clothespins onto feeder 32 in such manner that the feeder extends through the kerfs of the plurality of pins, the pins being positioned with their longitudinal axes transverse to the axis of feeder 32 and with their head ends and kerf ends pointing in uniform directions.

The rotation of each holder 22 about its own axis produced by the engagement of bevel pinion gear 28 with bevel ring gear 30 causes the wide flat edges of holder 22 to be successively parallel to the plane of the drawing and perpendicular to the plane of the drawing. When holder 22 is at station A, as indicated at position 22A, the wide flat edges of the holder are parallel to the plane of the drawing so that holder 22 lies in a common plane with feeder 32.

In order to dispense a predetermined number of clothespins from stationary feeder 32 to holder 22, a pivoted escapement member, generally indicated at 34, is mounted adjacent feeder 32. Escapement member 34 is provided at its opposite ends with projections 36 and 38 which are spaced apart a distance such that they span a predetermined number of clothespins positioned on feeder 32. Escapement 34 is oscillated back and forth by a suitable drive means in timed relation to the movement of intermittently rotating turret 10 in such manner that when one of the blade-like holders 22 is moved into alignment with the stationary blade-like feeder at station A, as in the case of holder 22A, projection 38 is moved out of engagement with the lowermost clothespin on feeder 32 to permit a predetermined number of clothespins between projections 36 and 38 to drop by gravity onto the aligned holder 22A. In the movement of escapement 34 which moves projection 38 out of engagement with the lowermost clothespin, the upper projection 36 is moved into engagement with the lower surface of the first clothespin above projection 36 to prevent movement of more than a predetermined number of clothespins onto holder 22A.

After the predetermined number of clothespins have been dispensed onto holder 22A by escapement device 34, turret 10 is again rotated by intermittent drive device 20 through a 45° angle, and a holder 22 is moved to the position occupied by holder 22B at station B. During the movement of holder 22 from station A to station B, pinion bevel gear 28 carried by the radially inner end of holder 22 meshes in geared engagement with stationary bevel gear 30 and rotates holder 22 so that the wide flat edges of the holder lie in horizontal planes perpendicular to the plane of the drawing when the holder reaches the position occupied by holder 22B.

A magazine dispenser generally indicated at 40 is positioned at station B for dispensing a stick or rigid strip 42 to the kerfs of the plurality of clothespins on holder 22B at station B. Magazine dispenser 40 is positioned vertically adjacent station B, and a plurality of sticks 42 are arranged in vertically superposed relation to each other in the dispenser, the longitudinal axes of the sticks extending substantially parallel to the longitudinal axis of holder 22B.

Dispenser 40 includes a reciprocating ejector or stripper 44 which lies beneath the stack of sticks 42 in such manner that movement of stripper 44 toward the kerf ends of clothespins P moves the lowermost stick 42 into engagement with the kerf ends of the plurality of pins on holder 22B. A suitable control means is provided for stripper 44 which operates the stripper in timed relation to the rotation of turret 10 to cause a stripping action by the stripper each time a different holder 22 arrives in position at station B.

With the holder in the position occupied by holder 22B, the lowermost stick 42 carried by magazine 40 is laterally moved by the reciprocating stripper member 44 into engagement with the slots or kerf ends of the plurality of clothespins on the holder 22B at station B. The thickness of stick 42 is such that it engages the kerf ends of the pins in tight frictional engagement when pushed a short distance into the kerf ends of the pins.

After stick 42 has been engaged with the clothespins on the holder indicated at 22B, turret 10 is again intermittently rotated by intermittent drive device 20 through an angle of 45° until the holder arrives at station C, in a position corresponding to that of the holder indicated at 22C. In this position, the axis of the holder is pointed downwardly at an angle of 45° from the horizontal plane. During the movement of the holder from station B to station C, the holder is again rotated through an angle of 90° about its longitudinal axis by the engagement of bevel pinion gear 28 with stationary bevel gear 30, thereby rotating the wide flat edges of holder 22 into planes parallel to the plane of the drawing. At station C, a plurality of pins all tightly frictionally engaged by stick 40, drop by gravity off of holder 22C onto and inclined ramp 46, along which the assembled pins, secured together by stick 42, move to a predetermined position for subsequent wrapping or packaging.

A curved guide member 48 extends for a portion of the arc between stations B and C adjacent but spaced radially outwardly a short distance from the arc described by the outer ends of rotating holders 22 in order to retain the pins and the stick which secures them together on holder 22 during the movement of the holder from station B to station C and preventing the assembled pins and stick 42 from dropping off holder 22 by gravity until the holder reaches station C. In the region of station B, guide member 48 is provided with a pair of spaced laterally projecting edge portions 50 which engage the outermost clothespin on holder 22B to cam the clothespins along the holder into close engagement with each other.

Thus it will be understood that there are provided in accordance with this invention an apparatus for and method of counting and assembling kerf type clothespins or other similar articles which permit a rapid counting and assembling of the clothespins or other articles. The apparatus assembles the clothespins or other articles into groups each having a predetermined number of units which are securely held together for subsequent wrapping or packaging. Furthermore, the apparatus of the invention provides an improved means for counting a predetermined number of articles at one location and for moving the articles to another location for another operation, such as packaging, or the like.

The clothespin counting and assembling apparatus hereinbefore described is intended for use as a component of a high speed automatic clothespin manufacturing, sorting, counting and assembling apparatus. The apparatus also includes a high speed continuously operating machine for contouring and kerfing the clothespins. In order to utilize to the best advantage the high speed production facilities of the contouring and kerfing machine, it is important that the related sorting, counting and assembling apparatus also be capable of high speed production. The counting and assembling apparatus of the present application fulfills this requirement.

It will be obvious to those skilled in the art that various changes may be made without departing from the spirit of the invention and therefore the invention is not limited to what is shown in the drawings and described in the specification but only as indicated in the appended claims.

What is claimed is:

1. An apparatus for counting and assembling slotted articles comprising a movable conveyor means, a holder supported by and movable with said conveyor means, said holder being adapted to receive slotted articles, a first dispensing station disposed along the path of movement of said holder, means at said first dispensing station for dispensing a predetermined number of slotted articles to said holder, a second dispensing station disposed adjacent the path of movement of said holder, means at said second dispensing station for dispensing securing means to the slots of a plurality of slotted articles positioned on said holder to unite said plurality of articles together as a group, and means for intermittently moving said conveyor means to index said holder successively to said first and second dispensing stations.

2. An apparatus for counting and assembling slotted articles comprising a movable conveyor means, a holder supported by and movable with said conveyor means, said holder being adapted to receive slotted articles, a first dispensing station including means disposed adjacent and above the path of movement of said holder for dropping a predetermined number of slotted articles by gravity onto said holder, a second dispensing station, means at said second dispensing station for dispensing securing means to the slots of a plurality of slotted articles positioned on said holder to unite the plurality of articles together as a group, and means for intermittently moving said conveyor means to index said holder successively to said first and second dispensing stations.

3. An apparatus for counting and assembling slotted articles comprising a movable conveyor means, a holder supported by and movable with said conveyor means, said holder including a blade-like portion adapted to receive and engage slotted articles, a first dispensing station including means disposed adjacent and above the path of movement of said holder for dropping a predetermined number of slotted articles by gravity onto said holder, a second dispensing station, means at said second dispensing station for dispensing securing means to the slots of a plurality of slotted articles positioned on said holder to unite the plurality of articles together as a group, and means for intermittently moving said conveyor means to index said holder successively to said first and second dispensing stations.

4. An apparatus as defined in claim 3, in which said holder is mounted for rotation about its own axis on said conveyor means, and including means for rotating said holder to different angular positions at said first and second dispensing stations.

5. An apparatus for counting and assembling kerf type clothespins comprising a movable conveyor means, a clothespin holder supported by and movable with said conveyor means, a first dispensing station including means disposed adjacent and above the path of movement of said clothespin holder for dropping a predetermined number of clothespins by gravity onto said holder, a second dispensing station, means at said second dispensing station for dispensing clothespin securing means to a plurality of clothespins positioned on said holder to unite the plurality of clothespins together as a group, and means for intermittently moving said conveyor means to index said holder successively to said first and second dispensing stations.

6. An apparatus for counting and assembling kerf type clothespins or the like comprising a movable conveyor means, a clothespin holder supported by and movable with said conveyor means, a first dispensing station including means disposed adjacent and above the path of movement of said clothespin holder for dispensing a predetermined number of clothespins by gravity onto said holder, a second dispensing station, means at said second dispensing station for dispensing a rigid stick-like member to the slots of a plurality of clothespins positioned on said holder to unite said plurality of clothespins together as a group, and means for intermittently moving said conveyor means to index said holder successively to said first and second dispensing stations.

7. An apparatus for counting and assembling kerf type clothespins or the like comprising a movable conveyor means, a clothespin holder supported by and movable with said conveyor means, a first dispensing station including means disposed adjacent and above the path of movement of said clothespin holder for dispensing a predetermined number of clothespins by gravity onto said holder, a second dispensing station, means at said second dispensing station for dispensing clothespin securing means to a plurality of clothespins positioned on said holder to unite said plurality of clothespins together as a group, a discharge station below the path of movement of said holder whereby clothespins on said holder may drop by gravity from said holder at said dispensing station, and means for intermittently moving said conveyor means to index said holder successively to said first and second dispensing stations and to said discharge station.

8. An apparatus for counting and assembling kerf type clothespins or the like comprising a movable conveyor means, a clothespin holder supported by and movable with said conveyor means, a first dispensing station including means disposed adjacent and above the path of movement of said clothespin holder for dispensing a predetermined number of clothespins by gravity onto said holder, a second dispensing station, means at said second dispensing station for dispensing a rigid stick-like member to the slots of a plurality of clothespins positioned on said holder to unite the plurality of clothespins together as a group, a dicharge station below the path of movement of said holder whereby clothespins on said holder may drop by gravity from said holder at said discharge station, and means for intermittently moving said conveyor means to index said holder successively to said first and second dispensing stations and to said discharge station.

9. An apparatus for counting and assembling kerf type clothespins or the like comprising a turret mounted for rotation about a horizontal axis, a clothespin holder supported by said turret and extending radially of the axis of rotation of the turret, said holder rotating in a vertical plane, a clothespin dispensing station disposed along the path of movement of said holder, said dispensing station being positioned to dispense clothespins by gravity onto said holder and including means for dispensing a predetermined number of clothespins to said holder, a second dispensing station, means at said second dispensing station for dispensing a rigid securing member to the slots of a plurality of clothespins positioned on said holder to unite the plurality of clothespins together as a group, a discharge station positioned below the path of movement of said holder whereby clothespins on said holder may drop by gravity from said holder at said discharge station, and means for intermittently rotating said turret to index said holder successively to said first and second dispensing stations and to said discharge station.

10. A method of assembling a plurality of one-piece kerf type clothespins into a unitary group which comprises the steps of moving a kerf-engaging holder relative to a supply means for the clothespins to a position in which the clothespins can drop by gravity onto the holder, permitting a predetermined number of the clothespins to drop onto the holder, inserting a rigid securing means into the kerfs of the plurality of clothespins on the holder to unite the plurality of clothespins together as a group, and subsequently moving the holder to a position in which the plurality of clothespins secured together by the securing means can drop by gravity from the holder.

11. A method of assembling a plurality of slotted articles into a unitary group which comprises the steps of moving a slot-engaging holder relative to a supply means for the slotted articles to a position in which the slotted articles can drop by gravity onto the holder, permitting a predetermined number of the articles to drop onto the holder, inserting a rigid securing means into the slots of the plurality of articles on the holder to unite the plurality of articles together as a group, and subsequently moving the holder to a position in which the plurality of articles secured together by the securing means can drop by gravity from the holder.

12. An apparatus for counting and assembling slotted articles comprising a movable conveyor means, a holder supported by and movable with said conveyor means, said holder including a blade-like portion adapted to receive and engage slotted articles, a first dispensing station disposed along the path of movement of said holder, means at said first dispensing station for dispensing a predetermined number of slotted articles to said holder, a second dispensing station disposed adjacent the path of movement of said holder, means at said second dispensing station for dispensing securing means to the slots of a plurality of slotted articles positioned on said holder to unite said plurality of articles together as a group, and means for intermittently moving said conveyor means to index said holder successively to said first and second dispensing stations.

13. An apparatus for counting and assembling kerf type clothespins or the like comprising a movable conveyor means, a clothespin holder supported by and movable with said conveyor means, a first dispensing station disposed along the path of movement of said holder, means at said first dispensing station for dispensing a predetermined number of clothespins onto said holder, a second dispensing station, means at said second dispensing station for dispensing a rigid stick-like member to the slots of a plurality of clothespins positioned on said holder to unite said plurality of clothespins together as a group, and means for intermittently moving said conveyor means to index said holder successively to said first and second dispensing stations.

References Cited in the file of this patent

UNITED STATES PATENTS

| | | |
|---|---|---|
| 2,466,733 | Norin | Apr. 12, 1949 |
| 2,599,547 | Feyrer | June 10, 1952 |